(12) United States Patent
Huang

(10) Patent No.: US 12,519,265 B2
(45) Date of Patent: Jan. 6, 2026

(54) SWITCH SOCKET COVER

(71) Applicant: Junjie Huang, Fuzhou (CN)

(72) Inventor: Junjie Huang, Fuzhou (CN)

( * ) Notice: Subject to any disclaimer, the term of this patent is extended or adjusted under 35 U.S.C. 154(b) by 327 days.

(21) Appl. No.: 18/237,383

(22) Filed: Aug. 23, 2023

(65) Prior Publication Data

US 2025/0070502 A1 Feb. 27, 2025

(51) Int. Cl.
*H01R 13/62* (2006.01)
*H01R 13/52* (2006.01)

(52) U.S. Cl.
CPC .................................. *H01R 13/52* (2013.01)

(58) Field of Classification Search
CPC ....................................................... H01R 13/52
USPC ............................................................ 439/587
See application file for complete search history.

(56) References Cited

U.S. PATENT DOCUMENTS

| | | | | |
|---|---|---|---|---|
| 4,109,095 A * | 8/1978 | Kling | ...................... | H02G 3/088 174/67 |
| 4,874,906 A * | 10/1989 | Shotey | ................... | H02G 3/088 174/67 |
| 6,028,268 A * | 2/2000 | Stark | ........................ | H02B 1/50 174/67 |
| 7,396,996 B1 * | 7/2008 | Shotey | ..................... | H02G 3/14 174/67 |
| 7,554,037 B1 * | 6/2009 | Shotey | ..................... | H02G 3/14 174/67 |
| 8,017,865 B1 * | 9/2011 | Baldwin | .................. | H02G 3/14 174/67 |
| 9,437,959 B2 * | 9/2016 | Sathyanarayana | ......................... | H01R 13/5213 |
| 9,935,436 B1 * | 4/2018 | Baldwin | ................. | H02G 3/14 |
| 10,199,814 B2 * | 2/2019 | Mortun | ................. | H02G 3/081 |
| 10,490,988 B1 * | 11/2019 | Baldwin | ................ | H02G 3/083 |
| 10,666,030 B2 * | 5/2020 | Dinh | ....................... | H02G 3/18 |
| 10,742,010 B1 * | 8/2020 | Baldwin | ................. | H02G 3/14 |
| 10,777,981 B1 * | 9/2020 | Baldwin | ................ | H02G 3/088 |
| 11,007,634 B1 * | 5/2021 | Tortorella, Jr. | .......... | B25H 3/02 |
| 11,334,121 B2 * | 5/2022 | Chen | ..................... | G06F 1/1681 |
| 11,749,932 B1 * | 9/2023 | Brownell | ................. | H02G 3/14 439/67 |
| 2008/0223601 A1 * | 9/2008 | Johnson | ................. | H02G 3/088 174/67 |
| 2008/0296039 A1 * | 12/2008 | Dinh | ....................... | H02G 3/12 174/53 |
| 2009/0071681 A1 * | 3/2009 | Junjie | .................... | H02G 3/088 174/66 |

(Continued)

*Primary Examiner* — Harshad C Patel

(57) ABSTRACT

Switch socket cover including base having socket receiving cavity for placing socket, cover plate and movable receiving assembly is provided. Cover plate is hinged to side of the base, and mounting groove is formed on cover plate. Movable receiving assembly is slidably connected to cover plate via mounting groove, and movable receiving assembly includes plug receiving cavity for receiving plug; first magnetic member is provided on top of movable receiving assembly; second magnetic member is provided on bottom of movable receiving assembly; and third magnetic member is provided on cover plate. Movable receiving assembly is mounted on cover plate. First magnetic member and second magnetic member on movable receiving assembly may cooperate with third magnetic member on cover plate so that plug receiving cavity protrudes from front face of cover plate or is located inside cover plate.

10 Claims, 9 Drawing Sheets

(56) References Cited

U.S. PATENT DOCUMENTS

| | | | | |
|---|---|---|---|---|
| 2010/0078189 A1* | 4/2010 | Leopold | ................ | H02G 3/088 |
| | | | | 174/67 |
| 2016/0164222 A1* | 6/2016 | Thomas | ................ | H01R 13/52 |
| | | | | 439/144 |
| 2024/0396250 A1* | 11/2024 | Harrison | .............. | H01R 13/447 |

* cited by examiner

SWITCH SOCKET COVER

TECHNICAL FIELD

The present invention relates to the field of power socket switch covers, and particularly relates to a switch socket cover.

BACKGROUND

Existing sockets generally do not have a waterproof function. Thus, in order to enable the socket to be used in various use scenarios, it is necessary to equip the socket with the switch socket cover to enable the plug to have the waterproof function. The switch socket cover generally provides a closed housing for the electrical equipment and fixes the electrical equipment, and has the effect of dust prevention, water resistance and preventing other impurities contacting the electrical equipment, so as to prevent the circuit system from short circuit and the potential risk of electrical equipment being damaged.

The prior art discloses a retractable switch socket cover, but the retractable height thereof is adjusted by means of a snap-in position. However, the snap-in strength is low, and it is easy to wear and break during long-term use, thus resulting in the failure of the whole structure.

SUMMARY

In view of the above-mentioned problems, the present application provides a switch socket cover for solving the technical problems of low snap-in strength, easy wear and breakage during long-term use, thus resulting in the failure of the whole structure.

To achieve the above object, in a first aspect, the inventors provide a switch socket cover, comprising a base having a socket receiving cavity for placing a socket, a cover plate and a movable receiving assembly; the cover plate is hinged to a side of the base, and a mounting groove is formed on the cover plate; the movable receiving assembly is slidably connected to the cover plate via a mounting groove, and the movable receiving assembly comprises a plug receiving cavity for receiving a plug; a first magnetic member is provided on a top of the movable receiving assembly; a second magnetic member is provided on a bottom of the movable receiving assembly; and a third magnetic member is provided on the cover plate.

Unlike the prior art, the technical solution of the present application provides that the base and the cover plate are hinged, so that the cover plate may be opened or closed relative to the base. In addition, in order to enable the thickness of the cover plate to be reduced, the movable receiving assembly is mounted on the cover plate. The first magnetic member and the second magnetic member on the movable receiving assembly may cooperate with the third magnetic member on the cover plate so that the plug receiving cavity protrudes from a front face of the cover plate or is located inside the cover plate. As a result, the snap-fit connection is changed to the magnetic connection, making it easier to switch the state of the movable receiving assembly, causing it less audible and less prone to wear, and avoiding structural failure.

As an embodiment of the present invention, the movable receiving assembly comprises a compressed limiting plate, a connector and an extended limiting plate, wherein the connector has a plug receiving cavity inside; the top of the connector is provided with the compressed limiting plate; the bottom of the connector is formed with an opening, and the connector is provided with the extended limiting plate at the periphery of the opening; the connector is arranged in a mounting groove; the compressed limiting plate is located outside a cover plate; the extended limiting plate is located inside the cover plate; a first magnetic member is mounted on the extended limiting plate; a second magnetic member is mounted on the compressed limiting plate; and a third magnetic member is mounted on the cover plate. Thus, two limit points may be determined by the compressed limiting plate and the extended limiting plate, and the structure thereof is simple and the magnetic member is easily installed.

As an embodiment of the present invention, the connector is fixedly connected to the extended limiting plate. As such, the connection is convenient and facilitates mounting of the movable receiving assembly on the cover plate.

As an embodiment of the present invention, the base is provided with a first water-blocking outer edge at the periphery of the socket receiving cavity; the first water-blocking outer edge protrudes from a front face of the base; a second water-blocking outer edge corresponding to the first water-blocking outer edge is disposed inside the cover plate; and when the cover plate is closed with respect to the base, the second water-blocking outer edge is located outside the first water-blocking outer edge. In this way, when the cover plate is closed with respect to the base, it is possible to prevent external water or moisture from entering the inside of the switch socket cover from the gaps when covered.

As an embodiment of the present invention, a wiring channel is disposed on the front face of the base. The wiring channel communicates with the socket receiving cavity. The wiring channel is used for placing a plug wire. In this way, the plug wire may be naturally placed after the plug is inserted through the wiring channel.

As an embodiment of the present invention, a threading hole corresponding to the wiring channel is formed at the outer edge of the cover plate; and when the cover plate is closed with respect to the base, the wiring channel communicates with the threading hole. In this way, the wiring channel communicates with the threading hole and may be increased in some degrees a height where the plug wire is placed, so that the plug wires may be placed better.

As an embodiment of the present invention, the cover plate is hinged with an upper side of the base; the wiring channel comprises a first wiring channel; the threading hole comprises a first threading hole; the first wiring channel is disposed at a lower side of the front face of the base; the edge of the cover plate is provided with the first threading hole; and when the cover plate is closed with respect to the base, the first wiring channel communicates with the first threading hole. In this way, when the cover plate is hinged with the upper side of the base, the switch socket cover may be vertically mounted according to actual situations. When the cover plate is closed with respect to the base, the first wiring channel communicates with the first threading hole. When it is desired to open the cover plate, the cover plate is flipped from bottom to top about the hinge point.

As an embodiment of the present invention, the cover plate is hinged to a right side of the base; the wiring channel comprises a second wiring channel; the threading hole comprises a second threading hole; the second wiring channel is disposed at a left side of the front face of the base; the edge of the cover plate is provided with the second threading hole; and when the cover plate is closed with respect to the base, the second wiring channel communicates with the second threading hole. In this way, when the cover plate is hinged to the right side of the base, the switch socket cover may be mounted horizontally, vertically or laterally according to actual situations. When the cover plate is closed with respect to the base, the first wiring channel communicates with the first threading hole.

As an embodiment of the present invention, an inner waterproof strip is disposed at a side of the back face of the cover plate close to a hinge shaft; and when the third magnetic member is magnetically connected to the second magnetic member, the inner waterproof strip is located at an outer side of the bottom of the movable receiving assembly. In this way, when the inner waterproof strip is provided at a side of the cover plate close to a hinge shaft, it is ensured that external water or moisture does not easily enter the inside of the switch socket cover when the plug receiving cavity protrudes at least partially out of the front face of the cover plate, thereby ensuring that the switch socket cover has good waterproof performance.

As an embodiment of the present invention, the switch socket cover further comprises a waterproof baffle, wherein the waterproof baffle is disposed on the cover plate or the base; the waterproof baffle has a wiring space for wiring the plug wire. Thus, on the one hand, the waterproof baffle has a waterproof function. On the other hand, the plug wire may be routed conveniently through the routing space to ensure the routing function. As a result, the external water or moisture does not easily enter the inside of the switch socket cover under the action of the waterproof baffle to ensure the waterproof effect of the switch socket cover as a whole.

BRIEF DESCRIPTION OF THE DRAWINGS

The drawings are only for purposes of illustrating the principles, implementations, applications, features and effects of particular embodiments and other related aspects of the present application and are not to be construed as limiting the present application.

In the accompanying drawings of the description.

DETAILED DESCRIPTION

Figure 1:
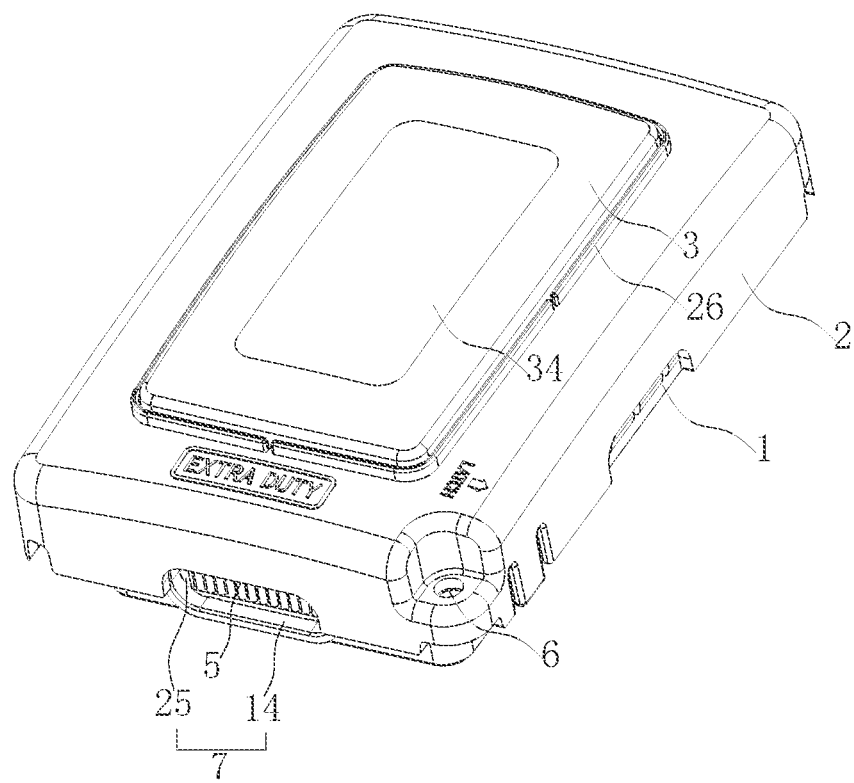
FIG. 1 is a schematic structural view of a switch socket cover according to an embodiment of the present application.

In order to explain in detail possible application scenarios, technical principles, practical implementations, and objects and effects of the present application, the following description is made in conjunction with the enumerated specific embodiments and the accompanying drawings. The embodiments described herein are intended only to more clearly illustrate the technical solution of the present application, and are therefore merely exemplary and are not intended to limit the scope of the present application.

The prior art discloses a retractable switch socket cover, but the retractable height thereof is adjusted by means of a snap-in position. However, the snap-in strength is low, and it is easy to wear and break during long-term use, thus resulting in the failure of the whole structure. The applicant has found the above-mentioned problem to improve the snap-fit structure by changing the snap-fit connection to a magnetic connection. The state switching is easier, it is less audible, the wear is less likely, and structural failure is avoided.

A switch socket cover 100 of the present application may be used for electrical equipment, primarily for sockets of the electrical equipment.

According to some embodiments of the present application, with reference to FIGS. 1 to 11, the present embodiment relates to a switch socket cover 100, including a base 1 having a socket receiving cavity 11 for placing a socket, a cover plate 2 and a movable receiving assembly 3. The cover plate 2 is hinged to a side of the base 1, and a mounting groove 21 is formed on the cover plate 2. The movable receiving assembly 3 is slidably connected to the cover plate 2 via a mounting groove 21, and the movable receiving assembly 3 includes a plug receiving cavity 35 for receiving a plug. A first magnetic member 331 is provided on a top of the movable receiving assembly 3. A second magnetic member 311 is provided on a bottom of the movable receiving assembly 3. A third magnetic member 22 is provided on the cover plate 2.

The base 1 may be fixed to the periphery of the socket or to electrical equipment. Optionally, a gasket is disposed on the back face of the base 1. The gasket is provided with an adhesive, and may be adhered to the periphery of the socket or to the electrical equipment. In some embodiments, the base 1 may also be bolted to the socket periphery or to the electrical equipment.

The base 1 is hinged to a side of the cover plate 2. Optionally, an upper side 27, a lower side, a left side or a right side of the cover plate is hinged to the base 1 depending on the actual use. A mounting groove 21 is formed in the middle of the cover plate 2.

The first magnetic member 331, the second magnetic member 311, and the third magnetic member 22 may all be magnets by which they are attracted close to each other. In some embodiments, in order to avoid excessive magnetic force between the magnets and causing misoperation, the first magnetic member 331 and the second magnetic member 311 are provided as metal sheets, and the third magnetic member 22 is a magnet. Alternatively, the first magnetic member 331 and the second magnetic member 311 are provided as magnets, and the third magnetic member 22 is a metal sheet. In actual use, when the movable receiving assembly 3 is in a compressed state, the third magnetic member 22 is attracted to the second magnetic member 311, and the plug receiving cavity 35 is located inside the cover plate 2. When the movable receiving assembly 3 is in an extended state, the third magnetic member 22 is attracted to the first magnetic member 331, and the plug receiving cavity 35 protrudes from the front face 23 of the cover plate.

The technical solution of the present application provides that the base 1 and the cover plate 2 are hinged, so that the cover plate 2 may be opened or closed with respect to the base 1. In addition, in order to enable the thickness of the cover plate 2 to be reduced, the movable receiving assembly 3 is mounted on the cover plate 2. The first magnetic member 331 and the second magnetic member 311 on the movable receiving assembly 3 may cooperate with the third magnetic member 22 on the cover plate 2 so that the plug receiving cavity 35 protrudes from a front face 23 of the cover plate or is located inside the cover plate 2. Thus, the snap-fit connection is changed to the magnetic connection, making it easier to switch the state of the movable receiving assembly 3, causing it less audible and less prone to wear, and avoiding structural failure.

According to some embodiments of the present application, optionally, as shown in FIGS. 4-8, the movable receiving assembly 3 includes a compressed limiting plate 31, a connector 32 and an extended limiting plate 33. The connector 32 has a plug receiving cavity 35 inside. The top of the connector 32 is mounted with the compressed limiting plate 31. The bottom of the connector 32 is formed with an opening 321, and the connector 32 is provided with the extended limiting plate 33 at the periphery of the opening 321. The connector 32 is arranged in the mounting groove 21. The compressed limiting plate 31 is located outside a cover plate 2. The extended limiting plate 33 is located inside the cover plate 2. A first magnetic member 331 is mounted on the extended limiting plate 33. A second magnetic member 311 is mounted on the compressed limiting plate 31. A third magnetic member 22 is mounted on the cover plate 2.

The compressed limiting plate 31 and the extended limiting plate 33 are connected via a connector 32. The connector 32 may be a connecting block with a certain thickness. The size of the connecting block is less than the size of the mounting groove 21, so that the connecting block may move relative to the cover plate 2. Both the top and the bottom of the connecting block are formed with opening. The compressed limiting plate 31 is completely covered on the top opening and partially protrudes from the connecting block, i.e., the size of the compressed limiting plate 31 is greater than the size of the connecting block, and the extended limiting plate 33 is mounted on the periphery of the bottom opening 321, so that the connecting block may move relative to the cover plate 2 with two limiting points. Specifically, a second magnetic member 311 and a first magnetic member 331 are respectively mounted on the compressed limiting plate 31 and the extended limiting plate 33. A third magnetic member 22 is mounted on the cover plate 2. The fixing of the two limiting points is completed by the magnetic connection. In some embodiments, the compressed limiting plate 31 is integrally formed with the connector 32.

Figure 4:
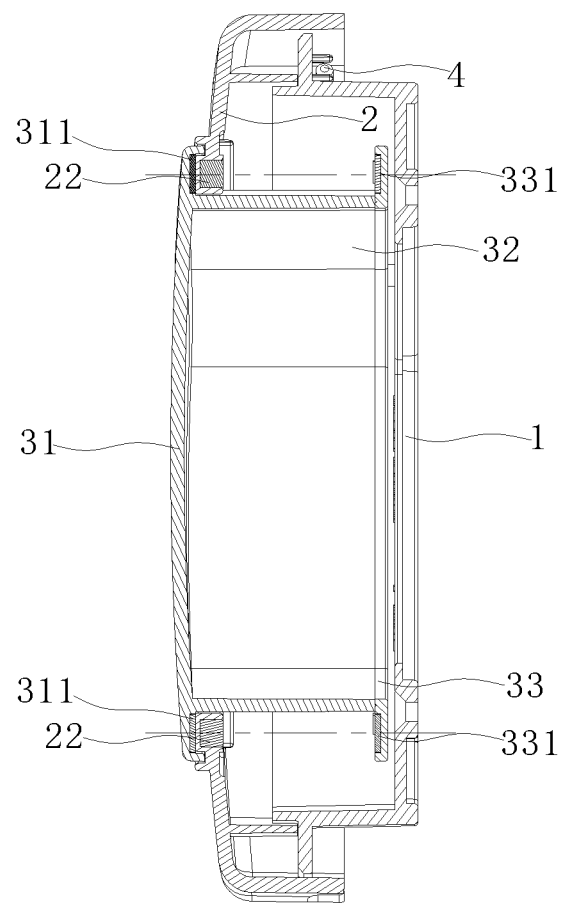
FIG. 4 is a schematic structural view of a third magnetic member being attracted to a second magnetic member when a movable receiving assembly according to an embodiment of the present application is in a compressed state.
Figure 5:
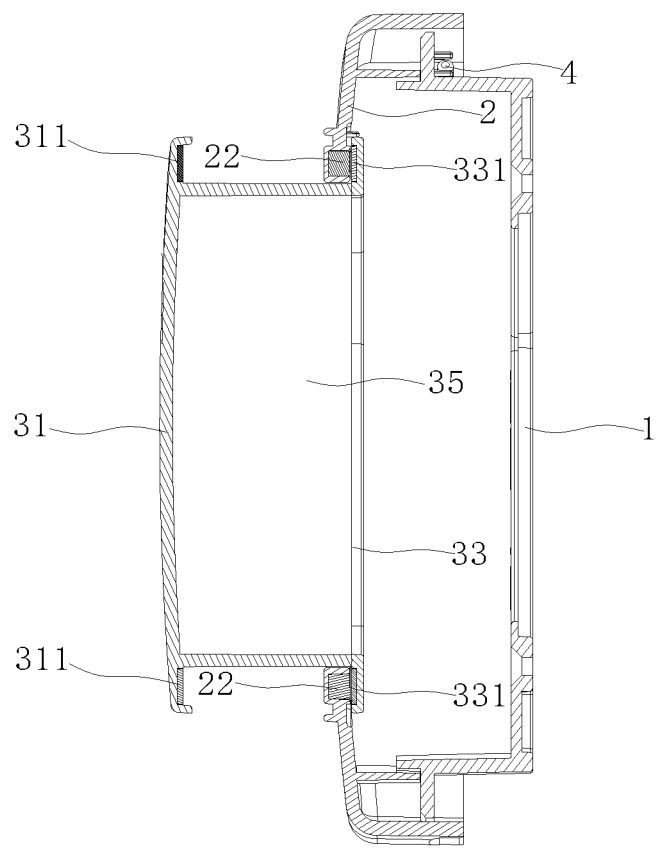
FIG. 5 is a schematic structural view of a third magnetic member being attracted to a first magnetic member when the movable receiving assembly according to an embodiment of the present application is in an extended state.
Figure 6:
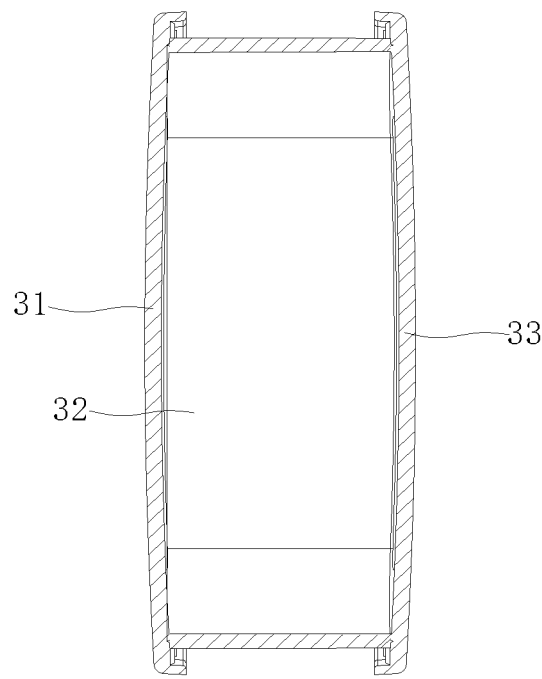
FIG. 6 is a schematic structural view of a movable receiving assembly according to an embodiment of the present application.
Figure 7:
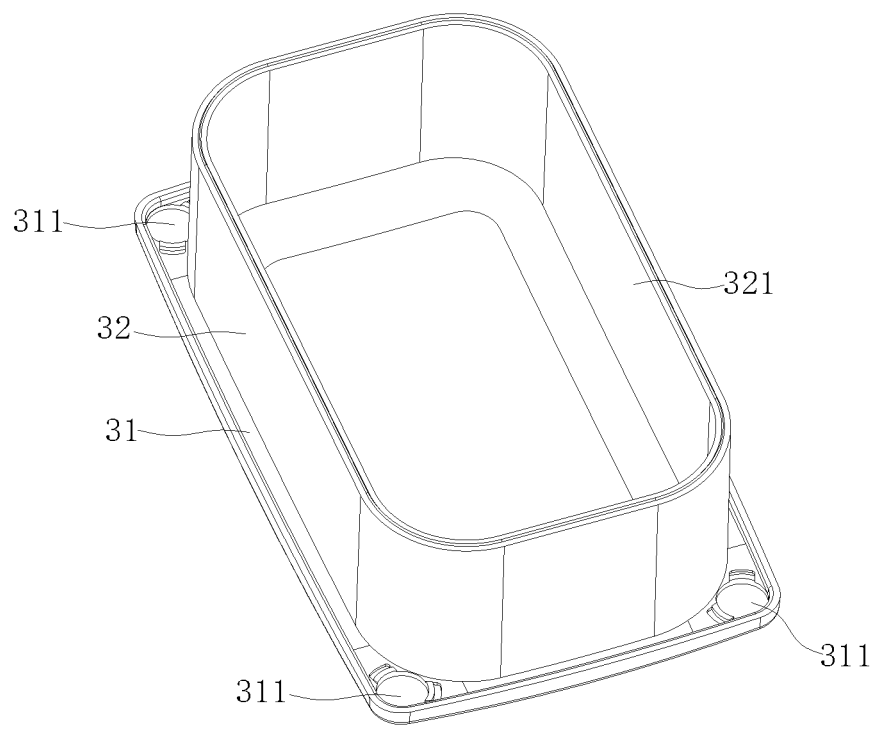
FIG. 7 is a schematic structural view of the connection between a connector and a compressed limiting plate according to an embodiment of the present application.
Figure 8:
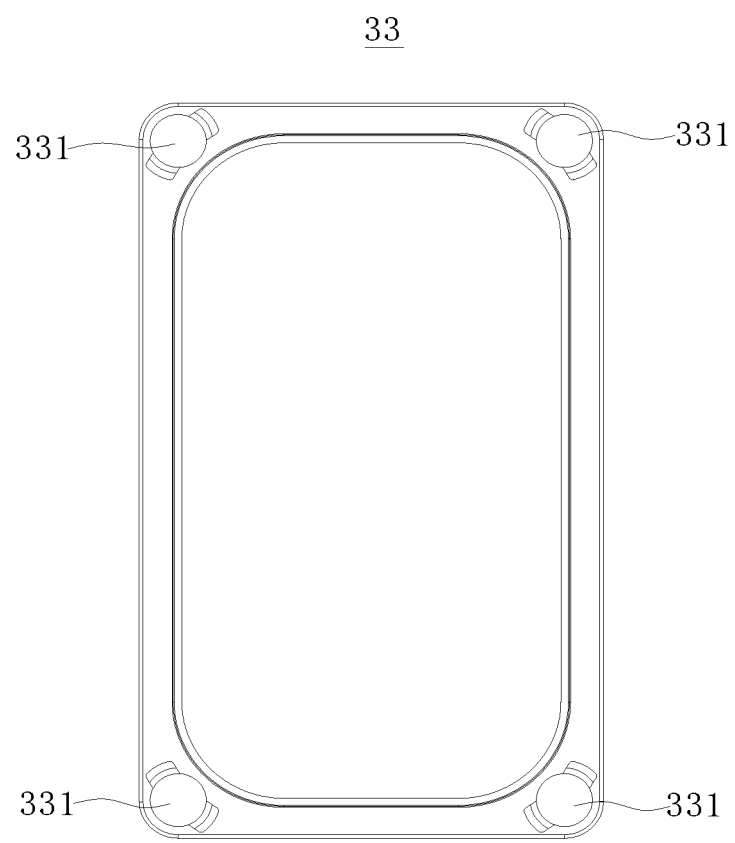
FIG. 8 is a schematic structural view of an extended limiting plate according to an embodiment of the present application.

According to some embodiments of the present application, optionally, as shown in FIGS. 4 and 5, second magnetic members 311 are respectively installed at four corners of the bottom of the compressed limiting plate 31. Third magnetic members 22 are respectively installed at corresponding positions inside the cover plate 2. First magnetic members 331 are respectively installed at four corners of the top of the extended limiting plate 33. Alternatively, the corresponding first magnetic member 331, second magnetic member 311, and third magnetic member 22 are positioned on the same horizontal line to facilitate mounting and securing.

Figure 9:
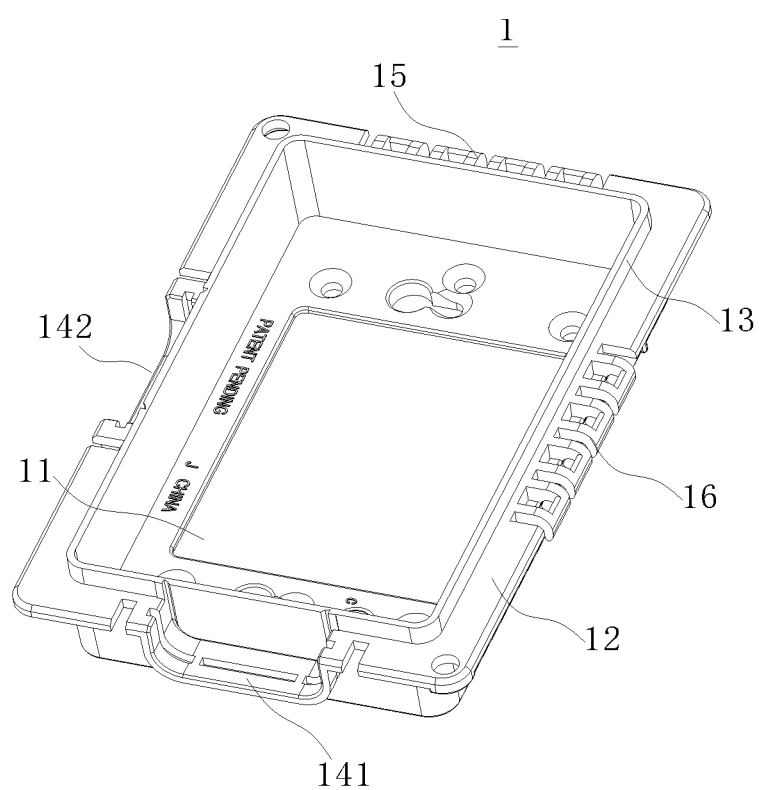
FIG. 9 is a schematic structural view of a base according to an embodiment of the present application.
Figure 11:
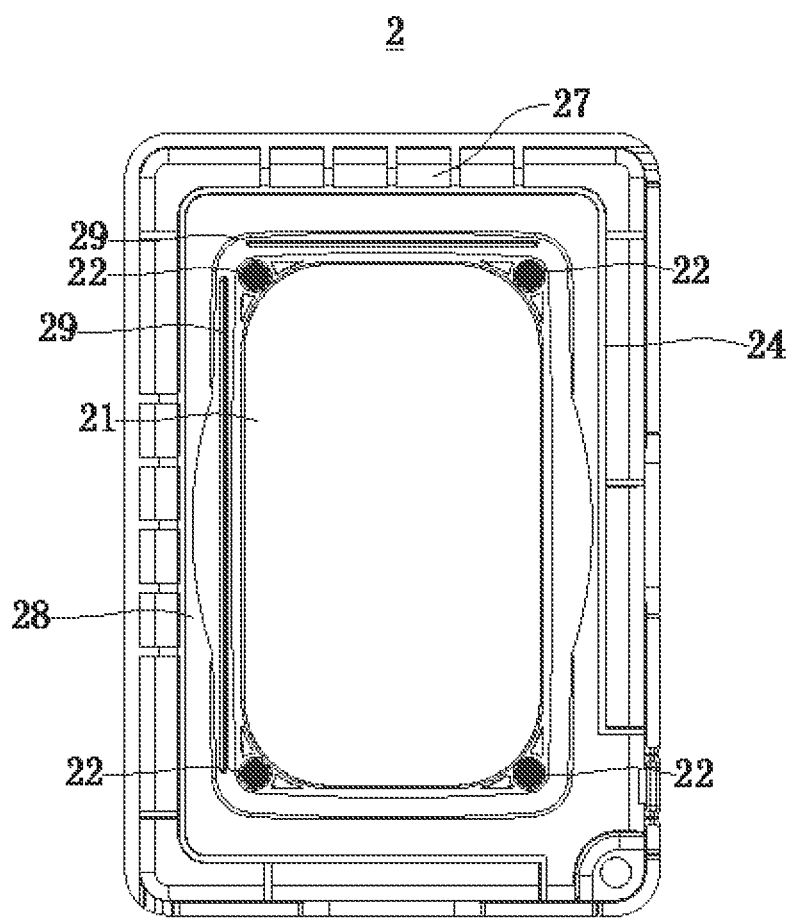
FIG. 11 is a rear view of a cover plate according to an embodiment of the present application.

According to some embodiments of the present application, optionally, as shown in FIGS. 9 and 11, the base 1 is provided with a first water-blocking outer edge 13 at the periphery of the socket receiving cavity 11. The first water-blocking outer edge 13 protrudes from the front face 12 of the base. A second water-blocking outer edge 24 corresponding to the first water-blocking outer edge 13 is provided inside the cover plate 2. The second water-blocking outer edge 24 is located outside the first water-blocking outer edge 13 when the cover plate 2 is closed with respect to the base 1.

The second water-blocking outer edge 24 is disposed on the back face 28 of the cover plate. Thus, when the cover plate 2 is closed with respect to the base 1, the second water-blocking outer edge 24 is located outside the first water-blocking outer edge 13, thereby preventing external water or moisture from entering the inside of the switch socket cover from 100 the gaps when covered.

According to some embodiments of the present application, optionally, as shown in FIG. 9, the front face 12 of the base is provided with a wiring channel 14 in communication with the socket receiving cavity 11. The wiring channel 14 is used for receiving a plug wire. In this way, the plug wire may be naturally placed after the plug is inserted through the wiring channel 14.

Figure 10:
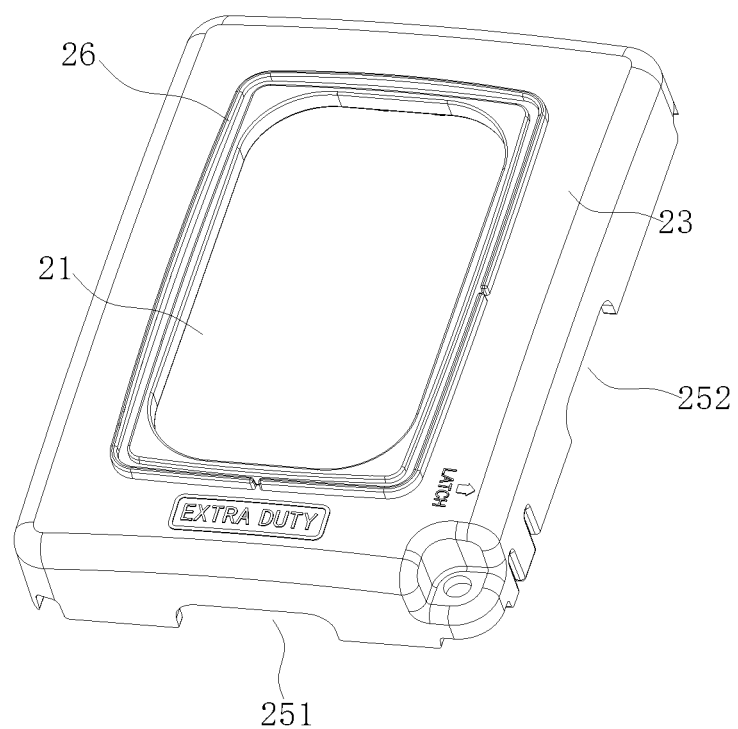
FIG. 10 is a schematic structural view of a cover plate according to an embodiment of the present application.

According to some embodiments of the present application, optionally, as shown in FIG. 10, the outside edge of the cover plate 2 is provided with a threading hole 25 corresponding to the wiring channel 14. When the cover plate 2 is closed with respect to the base 1, the wiring channel 14 communicates with the threading hole 25. In this manner, the wiring channel 14 communicates with the threading hole 25 and may be increase in some degrees a height where the plug wire is placed, so that the plug wires may be placed better.

According to some embodiments of the present application, optionally, as shown in FIGS. 9 to 11, the cover plate 2 is hinged with an upper side 15 of the base. The wiring channel 14 includes a first wiring channel 141. The threading hole 25 includes a first threading hole 251. The first wiring channel 141 is disposed at a lower side of the front face 12 of the base. The edge of the cover plate 2 is provided with the first threading hole 251. When the cover plate 2 is closed with respect to the base 1, the first wiring channel 141 communicates with the first threading hole 251.

Specifically, the first wiring channel 141 is disposed at the lower side of the front face 12 of the base. The first threading hole 251 corresponding to the first wiring channel 141 is disposed at the lower side of the back face 28 of the cover plate. In this way, when the cover plate 2 is hinged with the upper side 15 of the base, the switch socket cover 100 may be vertically mounted according to actual situations. When the cover plate 2 is closed with respect to the base 1, the first wiring channel 141 communicates with the first threading hole 251. When it is desired to open the cover plate 2, the cover plate 2 is flipped from bottom to top about the hinge point.

According to some embodiments of the present application, optionally, as shown in FIGS. 9-11, the cover plate 2 is hinged with the right side 16 of the base. The wiring channel 14 includes a second wiring channel 142. The threading hole 25 includes a second threading hole 252. The second wiring channel 142 is disposed at the left side of the front face 12 of the base. The edge of the cover plate 2 is provided with the second threading hole 252. When the cover plate 2 is closed with respect to the base 1, the second wiring channel 142 communicates with the second threading hole 252.

Specifically, the second wiring channel 142 is disposed at the left side of the front face 12 of the base. The second threading hole 252 corresponding to the second wiring channel 142 is disposed at the right side of the back face 28 of the cover. In this way, when the cover plate 2 is hinged with the right side 16 of the base, the switch socket cover 100 may be mounted vertically or laterally according to actual situations. When the cover plate 2 is closed with respect to the base 1, the first wiring channel 141 communicates with the first threading hole 251.

In other embodiments, the cover plate 2 may be formed with a first threading hole 251 and a second threading hole 252 at the same time. The base plate 1 may be formed with a first wiring channel 141 and a second wiring channel 142 at the same time. The hinging condition of the base plate 1 and the cover plate 2 may be determined according to actual use conditions.

According to some embodiments of the present application, optionally, the cover plate 2 is hinged with the left side of the base 1. The wiring channel 14 includes a third wiring channel 14. The threading hole 25 includes a third threading hole 25. The third wiring channel 14 is disposed at the right side of the front face 12 of the base. The third threading hole 25 is formed at the edge of the cover plate 2 (namely, the left side of the back face 28 of the cover plate). When the cover plate 2 is closed with respect to the base 1, the third wiring channel 14 communicates with the third threading hole 25.

According to some embodiments of the present application, optionally, as shown in FIG. 5, the cover plate 2 is hinged with a side of the base 1 by means of a pin 4. In this way, the pin 4 has a high strength and a high impact resistance, facilitating the safe hinging of the cover plate 2 with the base 1 and the rotation of the cover plate 2 about the pin 4.

Figure 3:
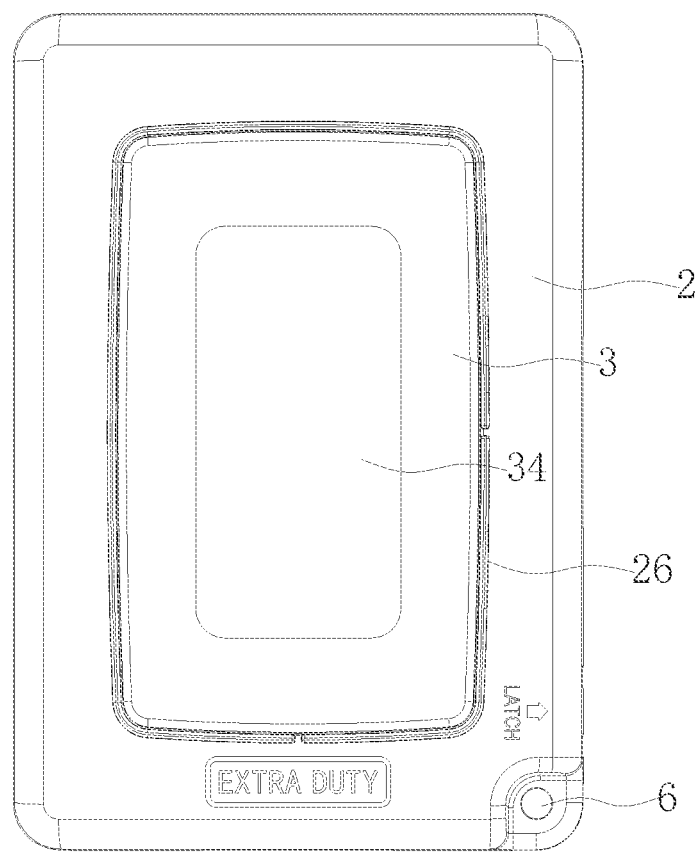
FIG. 3 is a front view of a switch socket cover according to an embodiment of the present application.

According to some embodiments of the present application, optionally, as shown in FIGS. 1 and 3, the movable receiving assembly 3 is made of a transparent material. Alternatively, the movable receiving assembly 3 is provided with a transparent window 34. Thus, it is convenient for the user to observe the usage of the socket.

According to some embodiments of the present application, optionally, as shown in FIGS. 1, 3 and 10, the front face 23 of the cover plate is provided with an outwardly projecting outer waterproof strip 26, which is located outside the compressed limiting plate 31 when the movable receiving assembly 3 in a compressed state. In this way, the outer waterproof strip 26 is well resistant to the ingress of external water when the movable receiving assembly 3 is in the compressed state.

According to some embodiments of the present application, optionally, as shown in FIG. 11, an inner waterproof strip 29 is disposed at a side of the back face 28 of the cover plate close to the hinge shaft. When the third magnetic member 22 is magnetically connected to the second magnetic member 311, the inner waterproof strip 29 is located at an outer side of the bottom of the movable receiving assembly 3. In this way, when the inner waterproof strip 29 is provided at a side of the cover plate 2 close to a hinge shaft, it is ensured that external water or moisture does not easily enter the inside of the switch socket cover 100 when the plug receiving cavity 35 protrudes at least partially out of the front face 23 of the cover plate, thereby ensuring that the switch socket cover 100 has good waterproof performance.

According to some embodiments of the present application, optionally, as shown in FIGS. 5 and 11, the back face 28 of the cover plate is further provided with an inner waterproof strip 29. Thus, the inner waterproof strip 29 may further have a waterproof function when the third magnetic member 22 is magnetically connected to the second magnetic member 311.

Figure 2:
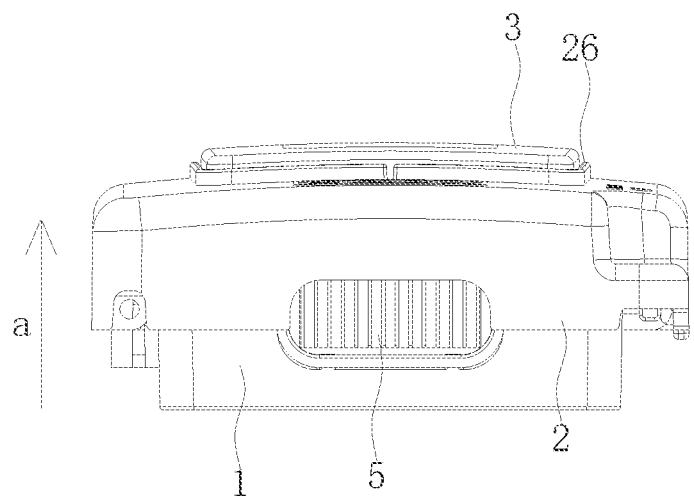
FIG. 2 is a bottom view of a switch socket cover according to an embodiment of the present application.

According to some embodiments of the present application, optionally, as shown in FIGS. 1 and 2, the switch socket cover 100 further includes a waterproof baffle 5. The waterproof baffle 5 is disposed on the cover plate 2 or the base 1. The waterproof baffle 5 has a wiring space for wiring the plug wire. Thus, on the one hand, the waterproof baffle 5 has a waterproof function. On the other hand, the plug wire may be routed conveniently through the routing space to ensure the routing function. As a result, the external water or moisture does not easily enter the inside of the switch socket cover 100 under the action of the waterproof baffle 5 to ensure the waterproof effect of the switch socket cover 100 as a whole.

According to some embodiments of the present application, optionally, as shown in FIGS. 1 and 2, the waterproof baffle 5 is installed in the wiring channel 14 and/or the threading hole 25 in a vertical direction a. In some embodiments, when the cover plate 2 is closed relative to the base 1, the wiring channel 14 communicates with the threading hole 25 to form a wire passing passage 7. The waterproof baffle 5 includes a first waterproof baffle and a second waterproof baffle. The first waterproof baffle is installed in the wiring channel 14. The second waterproof baffle is installed in the threading hole 25. When the cover plate 2 is closed with respect to the base 1, the first waterproof baffle and the second waterproof baffle cooperate to cover the wire passing passage 7. Thus, the waterproof baffle 5 may further include a first waterproof baffle and a second waterproof baffle. The first waterproof baffle is installed in the wiring channel 14. The second waterproof baffle is installed in the threading hole 25. The first waterproof baffle and the second waterproof baffle cooperate to cover the wire passing passage 7 so as to meet different installation requirements. In other embodiments, as shown in FIG. 2, the height of the waterproof baffle 5 in the vertical direction a is greater than or equal to the height of the wire passing passage 7 in the vertical direction a. In this way, it is ensured that even when the cover plate 2 is closed with respect to the base 1, the waterproof baffle 5 has a good waterproof effect on the wire passing passage 7.

According to some embodiments of the present application, optionally, as shown in FIGS. 1 and 2, a snap-fit slot 6 is formed on both the cover plate 2 and the base 1. A snap fit is provided to cooperate with the snap-fit slot 6 for locking the closed state of the cover plate 2 relative to the base 1. In this manner, misopening by others or children may be avoided. In some embodiments, a security lock may also be provided to prevent the misopening by others or by children.

According to some embodiments of the present application, optionally, the connector 32 is fixedly connected to the extended limiting plate 33. In this manner, it facilitates the connection and the mounting of the movable receiving assembly 3 on the cover plate 2. Specifically, when actually installed, the compressed limiting plate 31 is connected to the connector 32. Then, the connector 32 is installed in the mounting groove 21 from front to back. Finally, the extended limiting plate 33 is fixedly connected at the periphery of the opening 321.

According to the operating principle of the switch socket cover 100, the switch socket cover 100 is first installed in a designated position, in which the cover plate 2 is closed with respect to the base 1 and the movable receiving assembly 3 is in a compressed state. When it is desired to insert the plug into the socket, firstly, the cover plate 2 is opened with respect to the base 1. Secondly, the movable receiving assembly 3 is pushed out, so that the movable receiving assembly 3 is in an extended state. Then, the plug is inserted into the socket. Finally, the cover plate 2 is closed with respect to the base 1. When it is desired to pulled out the plug, the cover plate 2 is first opened with respect to the base 1. The plug is pulled out from the socket. Then, the movable receiving assembly 3 is pressed downwards, so that the movable receiving assembly 3 is brought into compression. Finally, the cover plate 2 is closed with respect to the base 1. Alternatively, when it is necessary to pull out the plug, the cover plate 2 may be opened with respect to the base 1. The plug may be pulled out from the socket. Then, the cover plate 2 may be closed with respect to the base 1. Finally, the movable receiving assembly 3 may be compressed by pressing the movable receiving assembly 3 downwards.

Although the present invention has been disclosed and illustrated with reference to particular embodiments, the principles involved are susceptible for use in numerous other embodiments that will be apparent to a person having ordinary skill in the art. This disclosure is, therefore, to be limited only as indicated by the scope of the appended claims.

What is claimed is:

1. A switch socket cover, including a base having a socket receiving cavity for placing a socket, a cover plate and a movable receiving assembly; said cover plate is hinged to a side of the base, and a mounting groove is formed in said cover plate; said movable receiving assembly is slidably connected to said cover plate via the mounting groove, and said movable receiving assembly includes a plug receiving cavity for receiving a plug; a first magnetic member is provided on a top of said movable receiving assembly; a second magnetic member is provided on a bottom of said movable receiving assembly; and a third magnetic member is provided on said cover plate.

2. The switch socket cover of claim 1, wherein said movable receiving assembly includes a compressed limiting plate, a connector and an extended limiting plate, wherein said connector has said plug receiving cavity inside; the top of the connector is provided with the compressed limiting plate; the bottom of the connector is formed with an opening, and the connector is provided with the extended limiting plate at the periphery of the opening; the connector is arranged in said mounting groove; the compressed limiting plate is located outside said cover plate; the extended limiting plate is located inside the cover plate; said first magnetic member is mounted on the extended limiting plate; said second magnetic member is mounted on the compressed limiting plate; and said third magnetic member is mounted on the cover plate.

3. The switch socket cover of claim 2, wherein the connector is fixedly connected to the extended limiting plate.

4. The switch socket cover of claim 1, wherein the base is provided with a first water-blocking outer edge at the periphery of the socket receiving cavity; the first water-blocking outer edge protrudes from a front face of the base; a second water-blocking outer edge corresponding to the first water-blocking outer edge is disposed inside the cover plate; and when the cover plate is closed with respect to the base, the second water-blocking outer edge is located outside the first water-blocking outer edge.

5. The switch socket cover of claim 1, wherein a wiring channel is disposed on a front face of the base, the wiring channel communicates with the socket receiving cavity, the wiring channel is used for placing a plug wire.

6. The switch socket cover of claim 5, wherein a threading hole corresponding to the wiring channel is formed at the outer edge of the cover plate; and when the cover plate is closed with respect to the base, the wiring channel communicates with the threading hole.

7. The switch socket cover of claim 6, wherein the cover plate is hinged with an upper side of the base; the wiring channel includes a first wiring channel; the threading hole includes a first threading hole; the first wiring channel is disposed at a lower side of the front face of the base; an edge of the cover plate is provided with the first threading hole; and when the cover plate is closed with respect to the base, the first wiring channel communicates with the first threading hole.

8. The switch socket cover of claim 6, wherein the cover plate is hinged to a right side of the base; the wiring channel includes a second wiring channel; the threading hole includes a second threading hole; the second wiring channel is disposed at a left side of the front face of the base; the edge of the cover plate is provided with the second threading hole; and when the cover plate is closed with respect to the base, the second wiring channel communicates with the second threading hole.

9. The switch socket cover of claim 1, wherein an inner waterproof strip is disposed at a side of a back face of the cover plate; and when the third magnetic member is magnetically connected to the second magnetic member, the inner waterproof strip is located at an outer side of the bottom of the movable receiving assembly.

10. The switch socket cover of claim 1, wherein the switch socket cover further includes a waterproof baffle, wherein the waterproof baffle is disposed on the cover plate or the base; the waterproof baffle has a wiring space for wiring the plug wire.

\* \* \* \* \*